S. R. SCHOLES.
GLASS MELTING RECEPTACLE.
APPLICATION FILED AUG. 31, 1914.
1,200,889.
Patented Oct. 10, 1916.
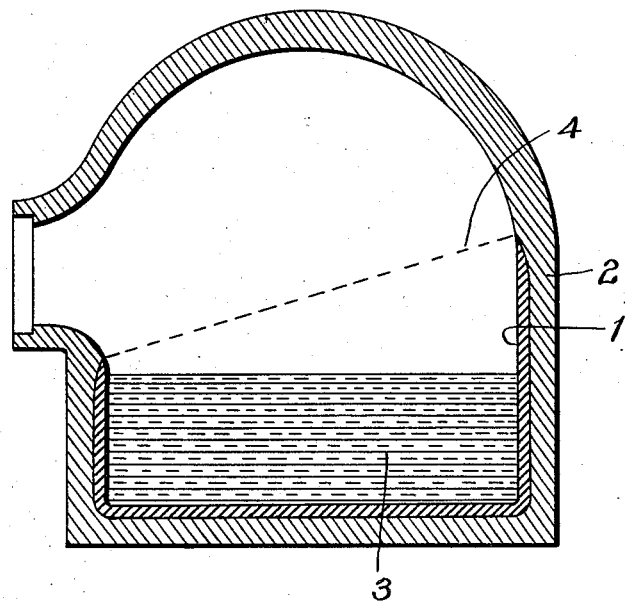
WITNESSES
INVENTOR
Samuel R. Scholes
by Christy and Christy
his attorneys.

UNITED STATES PATENT OFFICE.

SAMUEL R. SCHOLES, OF PITTSBURGH, PENNSYLVANIA, ASSIGNOR TO H. C. FRY GLASS COMPANY, OF ROCHESTER, PENNSYLVANIA, A CORPORATION OF PENNSYLVANIA.

GLASS-MELTING RECEPTACLE.

1,200,889.  Specification of Letters Patent.  Patented Oct. 10, 1916.

Application filed August 31, 1914. Serial No. 859,446.

*To all whom it may concern:*

Be it known that I, SAMUEL R. SCHOLES, residing at Pittsburgh, in the county of Allegheny and State of Pennsylvania, a citizen of the United States, have invented or discovered certain new and useful Improvements in Glass-Melting Receptacles, of which improvements the following is a specification.

The invention described herein relates to the construction of glass melting receptacles, such as pots, tanks, etc. Such receptacles, and particularly the type of glass pots which in actual practice have been found to be most desirable, rapidly deteriorate in service, and due to their deterioration, the glass being heated is prejudicially affected. As usually constructed, such pots are made of a mixture of substantially equal proportions of raw and new burnt clay and a smaller proportion of ground pot shell, about one per cent. of the mixture being an alkali vitrifying agent present as an impurity in these materials. When placed in service, the fluxes used in the glass batch, as well as the molten glass itself, cause the surface of the pot walls to become corroded, taking into the glass considerable foreign matter such as alumina, the presence of which, imperfectly mixed with the glass, is manifest in ware as cords or streak. Moreover, this corrosion is not uniform over the surface of the pot wall, but follows the interstices between the burnt clay or grog of the pot wall mixture, producing a honeycombed appearance of the wall. The less readily corroded burnt clay particles finally become surrounded by the encroaching glass, float into the main body thereof, and are gathered into the ware where they may appear as opaque stones or transparent nodules, visible because of a different refractory power than the glass proper. To overcome these prejudicial circumstances, it has been suggested that these glass melting receptacles be made of less porous and more vitreous clay than is the usual practice, but in a thick solid body of burnt clay, such as a glass pot, a certain degree of porosity or structural looseness is necessary to permit of expansion and contraction under the changes of temperature to which such vessels are necessarily subjected. Otherwise the vessels may break, and, in determining their construction the liability of breakage of less porous vessels has been considered of greater detrimental consequence than the corrosion of more porous vessels.

The object of the invention is to provide in a practical form a glass melting receptacle which will not break or be otherwise injured by the action of the furnace heat, and which will be corroded little if any by the body of molten glass or any of its constituents.

In the practice of my invention I construct the receptacle walls of two refractory materials, integrally united to each other, one forming an outer body portion and the other an interior lining, over all or such portion of the interior surface of the body portion as would in practice be in contact with the molten glass.

The body portion may be made of any suitable refractory material of good thermal endurance, that is, which will not crack or be otherwise injured by the wide variation in temperature or the relatively sudden temperature changes to which such receptacles are subjected in service. Preferably the body portion is made of clay having such characteristics as I have described, and may be made of the mixture already mentioned as being usually employed in the construction of glass pots.

The inner wall or lining, which is preferably materially thinner than the body portion, is made of a suitable refractory material, but, as distinguished from the outer wall, is of a vitreous non-porous nature, and, as such, adapted to withstand the corrosive action of the molten glass. The preferred material for the lining is clay having about two per cent. of its mass a vitrifying alkali. In practice I have obtained very satisfactory results with a lining consisting of a mixture of raw clay, burnt clay, pieces of ground pot-shell and about ten per cent, of its weight of feldspar. It will be understood, however, that other clay mixture, and other vitrifying agents than the alkali of feldspar, may be employed as well as those particularly specified.

In the accompanying drawing, illustrating one embodiment of my invention, there is shown a vertical central sectional view of the usual form of glass pots. In constructing the pot, the lining or inner wall 1 may be applied to the outer wall or body portion 2 in any desired manner. However, to assure the required integrality of the two bodies, the lining is preferably built-in in the same manner and at the same time as the outer wall is progressively constructed. The lining 1 may, as already stated, cover the entire inner surface of the body 2, but preferably extends but slightly above the surface line of the molten glass 3, as indicated by the dotted line 4.

While my invention may be practised in various forms of glass melting receptacles, it is particularly applicable to glass pots wherein the glass is melted by heat applied to the exterior surface of the vessel, rather than directly to the glass, as by a flame in glass tanks, or otherwise by electricity. I have found that the heat expansion and contraction of the outer body in no way injures the vitreous lining. In explaining this, my theory, held subject to alteration, is that the relatively thin lining of vitreous refractory material becomes, when heated to the glass melting temperature, sufficiently plastic to flow with, rather than be cracked from, the wall to which it is integrally united. At all events I have found that the lining or inner wall remains intact and is corroded little if any by the action of the molten glass.

I claim as my invention:

1. A glass melting receptacle comprising an outer body portion composed of a mixture of raw clay, raw burnt clay, and ground pot shell; and an interior lining integrally united with the body portion and consisting of a mixture of raw clay, burnt clay, and feldspar.

2. A glass melting receptacle comprising an outer body portion of refractory clay containing about one per cent. alkali, and an inner lining of refractory clay containing about two per cent. alkali.

3. A glass melting receptacle comprising an outer body portion constructed of a mixture of raw and burnt clay, and an inner lining integrally united with the body portion and constructed of raw clay, burnt clay and feldspar.

4. A glass-melting receptacle comprising an outer body portion constructed of a mixture of raw and burnt clay, and an inner lining integrally united with the body portion and constructed of raw clay, burnt clay and a vitrifying agent.

In testimony whereof I have hereunto set my hand.

SAMUEL R. SCHOLES.

Witnesses:
FRANCIS J. TOMASSON,
LOUIS G. IONATA.

Copies of this patent may be obtained for five cents each, by addressing the "Commissioner of Patents, Washington, D. C."